United States Patent Office 3,132,301
Patented May 5, 1964

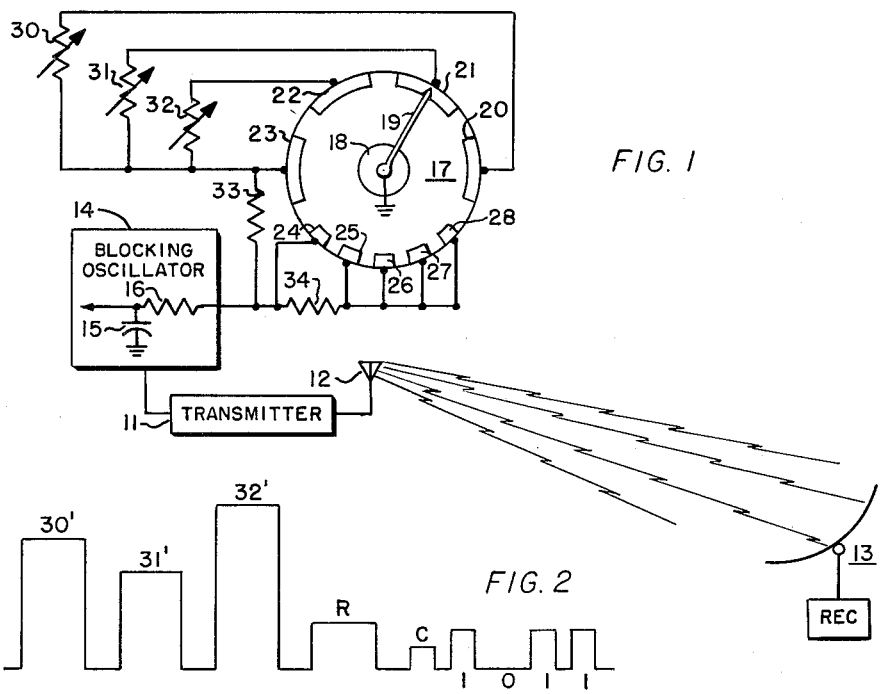
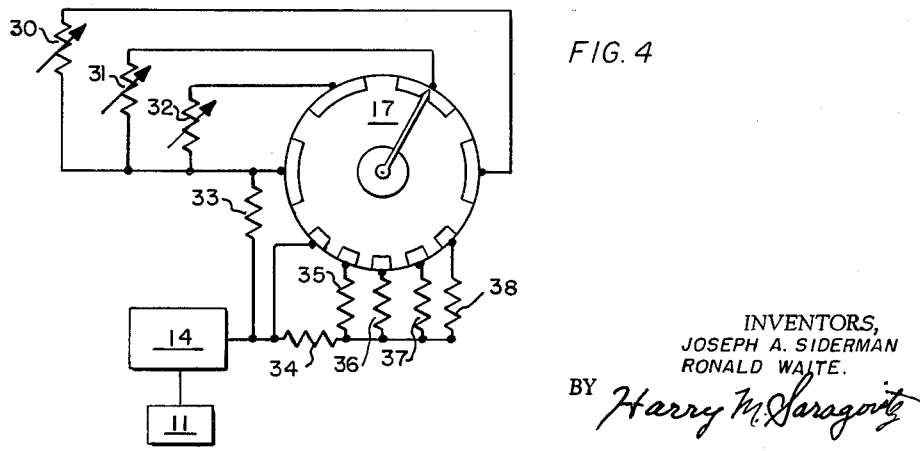
INVENTORS,
JOSEPH A. SIDERMAN
RONALD WAITE.
BY Harry M. Saragovitz
ATTORNEY.

3,132,301
RADIOSONDE HAVING MEANS FOR TRANSMITTING IDENTIFICATION PULSES
Joseph A. Siderman, Shrewsbury, and Ronald Waite, Belmar, N.J., assignors to the United States of America as represented by the Secretary of the Army
Filed Aug. 13, 1962, Ser. No. 216,691
4 Claims. (Cl. 325—113)
(Granted under Title 35, U.S. Code (1952), sec. 266)

The invention described herein may be manufactured and used by or for the Government for governmental purposes.

The present invention relates to a telemetering device and more particularly to a radiosonde which automatically identifies itself.

In the field of meteorology, it has been the general practice to employ an automatic radio transmitter usually carried aloft in an aircraft, free balloon, kite, or the like for transmitting, to a ground station, meteorological data. Although such devices served their purpose, they have not proved entirely satisfactory under all conditions of service for the reason that considerable difficulty has been experienced in tracking such devices when several radiosondes are airborne in the same general area. Since all such radiosondes are generally assigned the same transmitting frequency, to conserve the radio spectrum, it is difficult or practically impossible for a ground operator to be sure that his tracking antenna is fixed on its assigned radiosonde. Under such conditions the ground operator would receive signals continuously but would have no way of knowing which one of the many transmitters was sending the signals.

The general purpose of this invention is to provide a radiosonde which possesses none of the aforedescribed disadvantages. To attain this, the present invention contemplates the provision of an identification signal programed into the radiosonde for transmission to the ground station.

It is therefore an object of the present invention to provide a radiosonde which periodically identifies itself to the ground operator.

Another object is to provide a radiosonde wherein the identification signal is of a simple code form which is easily read.

A further object of the invention is the provision of an inexpensive, simple coding device which may be programed accurately in a relatively short time with a minimum number of operations.

Other objects and many of the attendant advantages of this invention will be readily appreciated, as the same becomes better understood by reference to the following detailed description, when considered in connection with the accompanying drawings in which like reference numerals designate like parts throughout the figures thereof and wherein:

FIGURE 1 shows a schematic diagram of a preferred embodiment of the invention.

FIGURE 2 is a wave form received by the ground station from the system of FIGURE 1.

FIGURE 3 is a wave form of the signal received by the ground operator from the system of FIGURE 4.

FIGURE 4 illustrates a modification of the device.

Referring now to the drawings, wherein like reference characters designate like or corresponding parts throughout the several views, there is shown in FIGURE 1, which illustrates a preferred embodiment, a radiosonde including a transmitter 11 having an antenna 12 for transmitting signals to a ground station 13. A modulator is connected to the transmitter and includes a conventional blocking oscillator 14 having a capacitor 15 and a resistor 16 connected to the grid of a tube (not shown) of the oscillator 14. Connected to the oscillator is a signal generator having a rotating switch 17, made up of a motor 18 which continuously rotates a grounded bush 19 over contact segments 20–28. A bank of variable resistors 30, 31 and 32, made responsive to various atmospheric conditions, are connected respectively to contact segments 20, 21 and 22. For example, resistor 30 may be a thermistor which will change its ohmic value with changes in the atmospheric temperature. Resistors 31 and 32 may be responsive to humidity and pressure respectively or any other atmospheric conditions desirable. Such resistors are well known in the art and will not be discussed in detail here. Resistors 30, 31 and 32 are all connected in common with contact segment 23 and reference resistor 33 which is connected to resistor 16 of oscillator 14. Contact segment 24 is connected directly to resistor 16 of the oscillator while segments 25–28 are all connected in common to an identification resistor 34 which is then connected to resistor 16. These segments are provided to produce a binary signal for identification purposes as will be later described.

The device of FIGURE 4 which shows a modified form of the invention is identical in all respects to the device of FIGURE 1 except that resistors 35, 36, 37 and 38 are added to the system for a purpose which will be later described.

The operation of the device will now be described. The radiosonde of FIGURE 1 is attached to a vehicle such as a balloon, the transmitter 11 is turned on and tuned to some prescribed carrier frequency, motor 18 is started, the identification code is programed, the entire assembly is then sent aloft and a tracking antenna at the ground station 13 homes in on the radiosonde. It is noted however, that several of these assemblies are usually sent aloft together in the same general area and a separate tracking antenna is assigned to each individual assembly. The action of oscillator 14 is such that pulses are produced on the carrier wave which are indicative of atmospheric conditions and which identify the particular radiosonde sending the data. The capacitor 15 of oscillator 14 is periodically charged and then permitted to discharge in a well known manner, through a path which is determined by the position of brush 19. For the position of the brush shown in FIGURE 1 the discharge path would be resistor 16, reference resistor 33, variable resistor 31, contact segment 21, brush 19 and then to ground. The length of time it takes capacitor 15 to discharge depends on the total value of the resistors in the discharge path. Therefore, the number of cycles or the frequency which oscillator 14 will produce during the time it takes brush 19 to scan one of the contact segments will depend on the total ohmic value of the resistances in the discharge path. It can be readily seen that as the atmospheric conditions change or as the radiosonde moves from one area to another the ohmic value of resistor 31 will change accordingly and therefore the frequency of oscillator 14 will change. The transmitter carrier frequency therefore will become modulated by oscillator 14 at a frequency rate which will be indicative of the atmospheric conditions. These signals will be received by the tracking antenna and a wave form such as shown in FIGURE 2 will be recorded by the ground station after the frequency modulated carrier is demodulated. The amplitude of the pulses shown in FIGURE 2 is a function of the modulating frequency and is therefore indicative of the atmospherical conditions. Pulses 30', 31' and 32' will be received respectively when elements 30, 31 and 32 are being scanned by brush 19. Pulse R which is a reference pulse will be received when brush 19 is scanning segment 23. This pulse is used as a datum from which the first three pulses are measured since only resistors 33 and 16 are in the discharge path.

The identification signal is generated as the brush scans segments 24–28. Pulse C is produced as segment 24 is scanned by brush 19 and, as can be seen from FIGURES 1 and 4, only resistor 16 of the oscillator is in the discharge path. This pulse will have its own distinctive characteristic and is provided as a warning that the identification code is to follow. The code is transmitted in a binary form i.e. pulse or no pulse. To accomplish this the conductors leading from the various segments 25–28 are either snipped or not snipped depending on the assigned code. For example the code 1011 is displayed in FIGURE 2. To accomplish this the conductor leading from segment 26 should be snipped or otherwise interrupted whereby pulses will be received only during the scanning of segments 25, 27 and 28 and a null will be received during the scanning of segment 26. Using four segments as shown in FIGURE 1 will permit sixteen different combinations. If more or less than sixteen radiosondes are to be used the number of segments may be increased or decreased accordingly.

The device of FIGURE 4 along with producing a binary identification signal will also produce a distinnctively different tone for each pulse in the code as can be seen in FIGURE 3. This is caused by the resistors 35–38 which will all have different values and which will produce a distinctively different modulation of the carrier frequency. A ground operator may then listen to these tones produced and determine the radiosonde being tracked.

It can be seen from the foregoing disclosure that there has been provided a radiosonde which may be easily tracked, quickly identified and wherein the identification signal, which may be programed accurately and quickly, is transmitted in the same manner as the meteorological data by using the same pulse generator. Obviously many modifications and variations of the present invention are possible in the light of the above techniques. It is therefore to be understood that within the scope of the appended claims, the invention may be produced otherwise than as specifically described.

What is claimed is:

1. A radiosonde comprising a radio transmitter having an antenna for transmitting a carrier wave to a ground station, a modulator connected to said transmitter for modulating said carrier wave, said modulator comprising a blocking oscillator having a grounded capacitor which is periodically charged and discharged, a switching circuit connected to said oscillator for providing a discharge path for said capacitor, said switching circuit comprising a scanning switch having a conductive grounded rotating brush and a plurality of contact segments mounted in the path of said brush, some of said segments being each connected to a variable sensing resistor for sensing atmospheric conditions, said variable resistors being all connected to a reference resistor, said reference resistor being connected to another of said segments and to said oscillator, and an identification resistor connected to said oscillator and to a plurality of said contact segments whereby a code may be programed into said radiosonde upon removing from the circuit a predetermined number of said latter contact segments.

2. The radiosonde of claim 1 wherein resistors of different values are inserted between said identification resistor and said latter contact segments whereby a distinctive tone is generated for identifying said radiosonde.

3. A radiosonde comprising a radio transmitter having an antenna for transmitting a carrier wave, modulating means connected to said transmitter for modulating said carrier wave, sensing means connected to said modulating means for providing pulses which are a function of some predetermined atmospheric conditions, identification means connected to said modulating means for providing pulses to identify said radiosonde, said identification means comprising a rotary arm and a plurality of contact segments mounted in the path of said rotary arm, and each said contact segment connected to said modulating means by an easily disconnectable electrical conductor whereby said identification means may be programmed to provide a series of pulses and nulls in binary form.

4. The radiosonde of claim 3 and further including a pluraltiy of resistors each connected between said contact segment and said modulating means for providing a distinctly different tone for each said contact segment.

References Cited in the file of this patent

UNITED STATES PATENTS

| | | |
|---|---|---|
| 2,318,646 | White | May 11, 1943 |
| 2,381,009 | Siderman | Aug. 7, 1945 |
| 2,463,527 | Dunmore | Mar. 8, 1949 |
| 2,509,215 | Craig et al. | May 30, 1950 |
| 2,719,284 | Roberts et al. | Sept. 27, 1955 |